United States Patent
Stirbu

(10) Patent No.: US 7,725,566 B2
(45) Date of Patent: May 25, 2010

(54) FRAMEWORK FOR ENABLING SERVICE TUNING FOR UPNP REMOTE ACCESS

(75) Inventor: Vlad Stirbu, Tampere (FI)

(73) Assignee: Nokia Corporation, Espoo (FI)

(*) Notice: Subject to any disclaimer, the term of this patent is extended or adjusted under 35 U.S.C. 154(b) by 495 days.

(21) Appl. No.: 11/692,156

(22) Filed: Mar. 27, 2007

(65) Prior Publication Data
US 2007/0244578 A1 Oct. 18, 2007

Related U.S. Application Data

(60) Provisional application No. 60/786,647, filed on Mar. 27, 2006.

(51) Int. Cl.
*G06F 13/00* (2006.01)
(52) U.S. Cl. .................. 709/220; 709/226; 709/237; 709/250
(58) Field of Classification Search ............. 709/220, 709/221, 222, 223, 226, 230, 237, 250
See application file for complete search history.

(56) References Cited

U.S. PATENT DOCUMENTS

| | | | |
|---|---|---|---|
| 2003/0163548 A1* | 8/2003 | Stickler ...................... 709/218 |
| 2004/0233904 A1 | 11/2004 | Saint-Hilaire et al. |
| 2005/0055352 A1* | 3/2005 | White et al. .................. 707/10 |
| 2005/0096753 A1 | 5/2005 | Arling et al. |
| 2005/0111486 A1 | 5/2005 | Lee et al. |
| 2005/0132366 A1 | 6/2005 | Weast |
| 2005/0185658 A1* | 8/2005 | Kamiwada et al. .......... 370/401 |
| 2005/0210155 A1* | 9/2005 | Oeda et al. ................... 709/249 |
| 2006/0133392 A1* | 6/2006 | Ajitomi et al. .............. 370/401 |
| 2006/0184693 A1* | 8/2006 | Rao et al. .................... 709/245 |
| 2008/0205419 A1* | 8/2008 | Shin et al. ................... 370/401 |

FOREIGN PATENT DOCUMENTS

WO WO 2005/103913 11/2005

OTHER PUBLICATIONS

Belimpasakis and Stirbu, Remote access to universal plug and play (UPnP) devices utilizing the atom publishing protocol. Proceedings of the Third International Conference on Networking and Services, IEEE Computer Society, 2007, Retrieved from: http://portal.acm.org/citation.cfm?id=1271317.
International Search Report for PCT Application PCT/IB2007/000777.

* cited by examiner

*Primary Examiner*—Viet Vu
(74) *Attorney, Agent, or Firm*—Foley & Lardner, LLP

(57) ABSTRACT

A system and method for enabling a UPnP device to provide services on behalf of another UPnP device. According to the present invention, all services requested from the original serving devices are redirected to the shadow device, while the original device has no knowledge of this redirection. With the present invention, a remote UPnP device requesting a service has no knowledge that the service is being provided by a shadow device.

26 Claims, 10 Drawing Sheets

FRAMEWORK FOR ENABLING SERVICE TUNING FOR UPNP REMOTE ACCESS

CROSS-REFERENCE TO RELATED PATENT APPLICATIONS

This application claims priority from Provisional Application U.S. Application 60/786,647, filed Mar. 27, 2006, incorporated herein by reference in its entirety.

FIELD OF THE INVENTION

The present invention relates generally to Universal Plug and Play (UPnP) remote access. More particularly, the present invention relates to systems where a UPnP device can provide services on behalf of another UPnP device to devices requesting remote access.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

UPnP technology defines an architecture for pervasive peer-to-peer network connectivity of intelligent appliances, wireless devices, and personal computers of all form factors. UPnP technology is designed to bring easy-to-use, flexible, standards-based connectivity to ad-hoc or unmanaged networks whether in the home, in a small business, in public spaces, or attached to the Internet. UPnP technology provides a distributed, open networking architecture that leverages TCP/IP and Web technologies to enable seamless proximity networking in addition to control and data transfer among networked devices.

The UPnP Device Architecture (UDA) is designed to support zero-configuration, "invisible" networking and automatic discovery for a breadth of device categories from a wide range of vendors. With the UDA a device can dynamically join a network, obtain an IP address, convey its capabilities, and learn about the presence and capabilities of other devices.

Remote Access enables remote UPnP devices to interact with the UPnP devices located in a home network, as they are physically attached to the home network. Typically, the remote device connects to the home network using a secure tunnel such as the tunnel provided by IP security (IPsec) technology. A simple service discovery protocol (SSDP) proxy in the home network interacts with the remote device and provides several functionalities in discovery of services provided by home network devices. For example, the SSDP proxy maintains a list of local devices/services that can be discovered, forwards search/notify requests, filters multicast messages, etc.

A number of systems have been developed involving the creation of "virtual devices," but each has its drawbacks. One such system comprises a UPnP relay tool that is based upon the idea of bridging two UPnP networks by creating a virtual device in one network for each device in the other network. However, this approach is very complex and requires software to run on a personal computer. This system is not scalable because, as new services/functionalities are added in the UPnP stack, the relay tool must be updated on both sides of the UPnP network. U.S. Application Publication No. 2004/0233904 describes a mirroring agent that is similar to the virtual device described above. This mirroring agent also possess the same shortcomings as the virtual agent.

The concept of virtual devices is described by the Digital Living Network Alliance, an alliance of leading companies in the consumer electronics, mobile and personal computer industries. Virtual devices are described as bridging the mobile handheld domain and the fixed network domain. The roles of the virtual devices are to offer transcoding, transcaling, transrating services between the two domains as they don't share common codecs. However, no such support currently exists at the UPnP stack of network protocols.

SUMMARY OF THE INVENTION

The present invention provides a system and method for enabling a UPnP device to provide services on behalf of another UPnP device, while the other UPnP device has no knowledge of this re-direction. The device providing the services is referred to herein as a "virtual device" or "shadow device." According to the present invention, all services requested from the original serving devices are redirected to the shadow device, while the original device has no knowledge of this redirection. With the present invention, a remote UPnP device requesting a service has no knowledge that the service is being provided by a shadow device. With the present invention, UPnP devices can register to a SSDP proxy so that they can act as a shadow device of a home UPnP device for remote devices requesting access. The SSDP proxy keeps SSDP information synchronized between the home network and the remote UPnP device. When a shadow device registers to the SSDP proxy, the proxy will expose the shadow device to remote entities instead of exposing the actual home device.

The present invention possesses a number of advantages over conventional systems. The present invention is lightweight and allows simple devices (e.g., internet gateway devices) to play the critical roles in the Remote Access (RA) to UPnP networks architecture; there is no need for a personal computer. Additionally, the SSDP proxy is independent on the particular service that is shadowed. Furthermore, shadow service features can be easily upgraded/enhanced, as they appear as plug-ins in the RA architecture.

Various embodiments of the present invention comprise a method, computer program product, SSDP proxy device, shadow device and system for enabling communication between a remote device and a shadow device. These embodiments of the present invention involve aggregating device information from a real device located within a home network, the aggregated device information including a device description document URL reflecting a real device unique user identifier. A request is received from a shadow device to register as the shadow device, the shadow device including a shadow device unique user identifier. In response, the device description document URL is rewritten or modified to reflect the shadow device unique user identifier instead of the real device unique user identifier, after which the device description document URL including the shadow device unique user identifier is transmitted to the remote device. Once received by the remote device, the remote device uses the shadow device unique user identifier to communicate directly with the shadow device instead of the real device.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention provides a system and method for enabling a UPnP device to provide services on behalf of another UPnP device, while the other UPnP device has no knowledge of this re-direction. The device providing the services is referred to herein as a "virtual device" or "shadow device." According to the present invention, all services requested from the original serving devices are redirected to the shadow device, while the original device has no knowledge of this redirection. With the present invention, a remote UPnP device requesting a service has no knowledge that the service is being provided by a shadow device. With the present invention, UPnP devices can register to a SSDP proxy so that they can act as a shadow device of a home UPnP device for remote devices requesting access. The primary function of the SSDP proxy is to keep SSDP information synchronized between the home network and the remote UPnP device. When a shadow device registers to the SSDP proxy, the proxy will expose the shadow device to remote entities instead of exposing the actual home device.

Some services, such as audiovisual (AV) devices, can offer improved performance for remote devices if they perform some transformation of the content and filtering access to some features of the home device. Usually the transformation is performed in a shadow UPnP device that impersonates the real devices when interactions with remote devices are required. However, the entire process should be automatic and should not involve the user. This is due to the fact that users of UPnP devices are not expected to understand how the shadow device impersonates the real device, and thereafter the real device should not be visible to the remote device to which it is communicating.

Whenever a device that is to perform "shadow" functions for a real device is added to the home network, the intended shadow device will discover the SSDP proxy and request to register as the shadow device for the real device. This request includes the universal unique identifier (UUID) of the device that will be shadowed. The SSDP proxy accepts the registration and updates the aggregated information by replacing the device description document (DDD) URL of the real device with the DDD URL of the shadow device. The SSDP proxy updates the remote device with the new announcement. When the remote device receives this information, it starts communicating with the shadow device. The remote device is not aware that it is communicating with a shadow device instead of the real device, as communications are occurring transparently.

Figure 1:
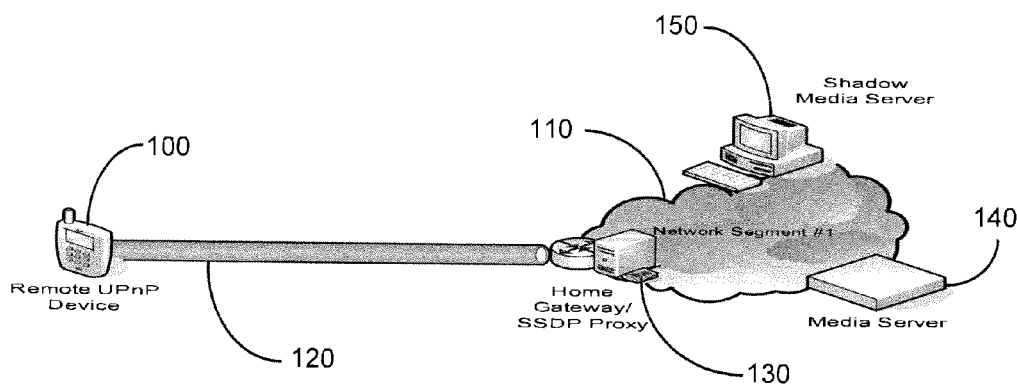
FIG. 1 is a representation of a network topology within which one embodiment of the present invention may be implemented.

FIG. 1 depicts a typical remote access scenario, where a remote UPnP device 100 is connected to a home network 110 through an IPsec tunnel 120. In the home network 110 of FIG. 1, there is a SSDP proxy 130, a media server 140 and a personal computer 150. The personal computer 150 runs a service that offers media server features which are optimized for constrained devices (e.g., scaling, transcoding, etc.). The personal computer 150, which operates as a custom media server, act as the "shadow" of the real media server 140 for interactions with the remote UPnP device 100. It should therefore be understood that, in terms of this example, the personal computer 150 and the shadow device comprise the same device. The SSDP proxy 130 monitors the SSDP traffic and aggregates the information about the various devices and services available within the home network 110. This information is typically found in the SSDP queries and advertisements that are transmitted within the home network 110.

Figure 2:
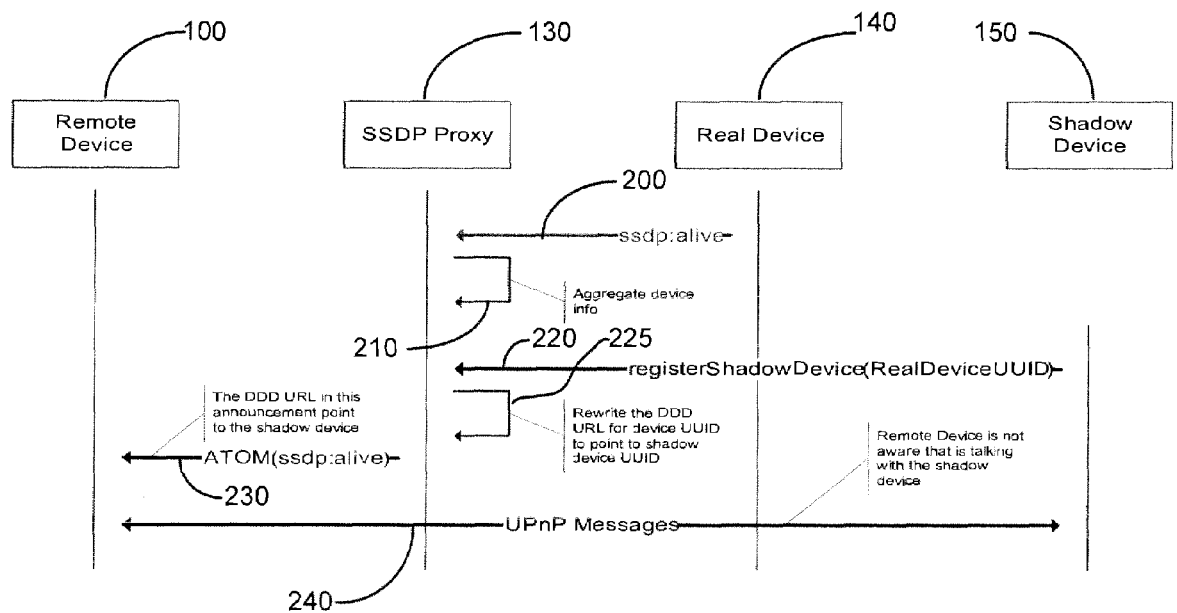
FIG. 2 shows the process of registering a shadow device according to one embodiment of the present invention.

The process of aggregating the SSDP information in the SSDP proxy 130 can occur passively by listening to the SSDP announcements. Alternatively, this process can be actively implemented by sending discovery queries into the home network 110. FIG. 2 shows how passive aggregation can occur according to one embodiment of the present invention. FIG. 2 shows the interaction among the remote UPnP device 100, the SSDP proxy 130, the "real device" or media server 140, and the shadow device 150. At 200 in FIG. 2, a "ssdp:alive" message is transmitted from the real device 140 to the SSDP proxy 130. The SSDP proxy 130 then proceeds to aggregate the device information at 210. At 220, the shadow device 150 registers with the SSDP proxy 130 by transmitting a "registerShadowDevice" message including a UUID for the real device 140. At 225, the SSDP proxy 130 rewrites the DDD URL for the device UUID such that the URL points to the UUID of the shadow device 150 instead of the UUID for the real device 140. At 230, a web syndication message in the form of an ATOM(ssdp:alive) announcement is transmitted from the SSDP proxy 130 to the remote UPnP device 100. In the announcement, the DDD URL points to the shadow device 150. As a result, subsequent UPnP messages are transmitted at 240 between the remote UPnP device 100 and the shadow device 150.

In the event that a more active aggregation is desired, the SSDP proxy 130 can transmit various discovery requests within the home network 110, which are then responded to by the various devices therein.

The process of updating the remote UPnP device 100 with a new announcement, according to various embodiments of the present invention, is generally as follows. It is important to note, however, that the present invention works with a wide variety of SSDP proxies and is not intended to be limited to SSDP proxies which are based upon the ATOM format or any other particular format.

According to various embodiments of the present invention, a UPnP device aggregator (i.e., the SSDP proxy 130) listens to standard SSDP device advertisements and collects information about UPnP devices and services that are available in the network. The information is then aggregated in RSS/ATOM feeds.

An enhanced UPnP device implements functionality that allows out-of-band discovery mechanisms to present information in a format that is compatible with UPnP (e.g., SSDP format). For service advertisements and as represented, an electronic device that hosts the service, transmits a "Service Advertisement" message containing a service advertisement. The payload in the "Service Advertisement" message is the same as for a standard UPnP SSDP message:

```
NOTIFY * HTTP/1.1
HOST: 239.255.255.250:1900
CACHE-CONTROL: max-age = seconds until advertisement expires
LOCATION: URL for UPnP description for root device
NT: search target
NTS: ssdp:alive
SERVER: OS/version UPnP/1.0 product/version
USN: advertisement UUID
```

A control point device that hosts the control point receives the "Service Advertisement" message and continues the exchange using standard UPnP messages. For example, the control point device can transmit a "Get Description" message, after which the electronic device can respond with a "XML Description" message. UPnP messages can also flow between the electronic device and the control point device.

For a service query, the control point device that hosts the UPnP control point sends a service query message. The payload of this message is the same as for a standard UPnP SSDP message:

```
M-SEARCH * HTTP/1.1
HOST: 239.255.255.250:1900
MAN: "ssdp:discover"
MX: seconds to delay response
ST: search target
```

The electronic device that hosts the UPnP Service responds also over the location-limited channel with a service response message with the same payload as a standard UPnP SSDP message:

```
HTTP/1.1 200 OK
CACHE-CONTROL: max-age = seconds until advertisement expires
DATE: when response was generated
EXT:
LOCATION: URL for UPnP description for root device
SERVER: OS/version UPnP/1.0 product/version
ST: search target
USN: advertisement UUID
```

After the service response message, the devices continue the exchange using standard UPnP messages. For example, the control point device can transmit a "Get Description" message, after which the electronic device can respond with a "XML Description" message. UPnP messages can also flow between the electronic device and the control point device. Computer software code can be used to implement these steps.

Figure 3:
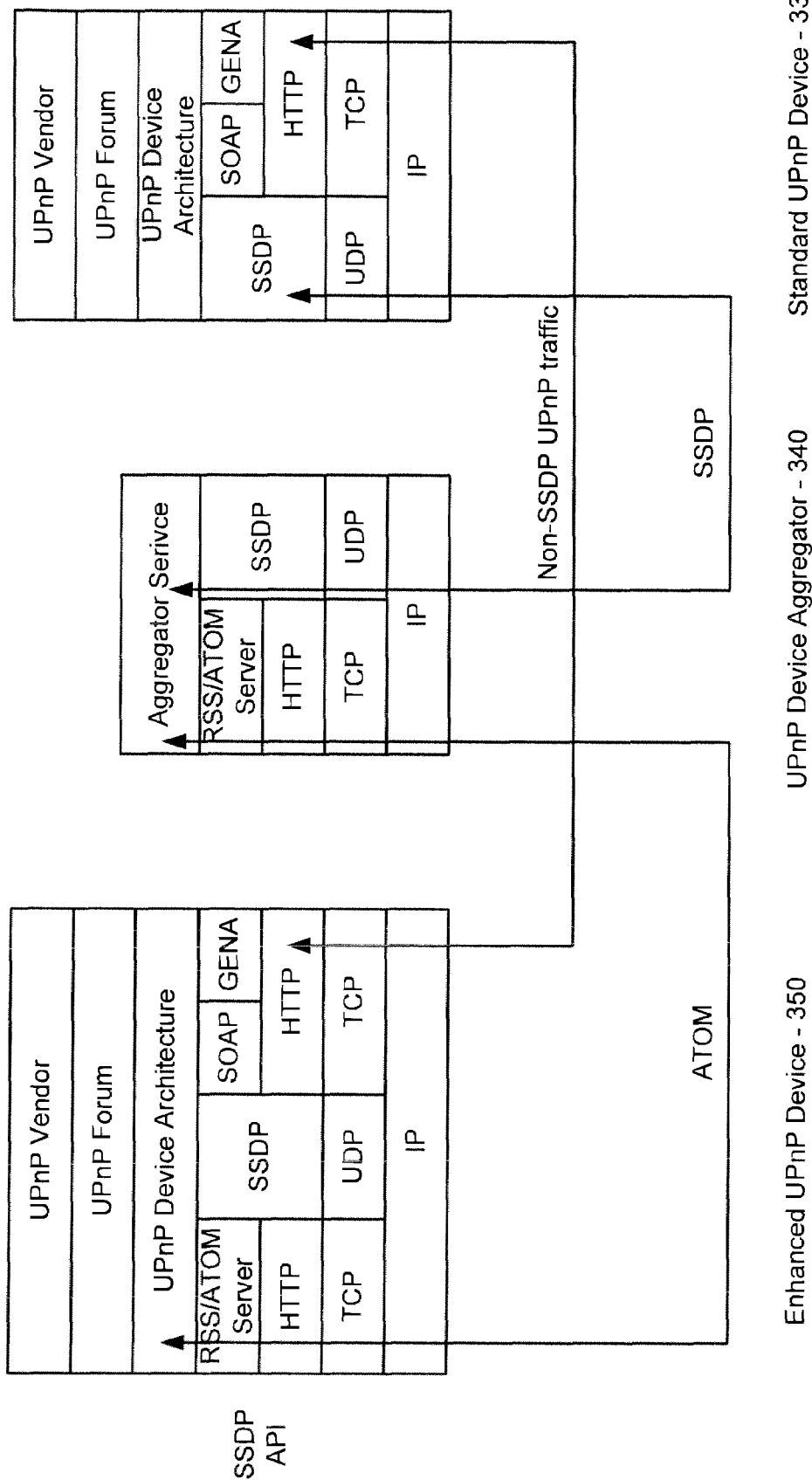
FIG. 3 is a representation of the protocol stack among a standard UPnP device, a UPnP device aggregator, and an enhanced UPnP device.
Figure 4:
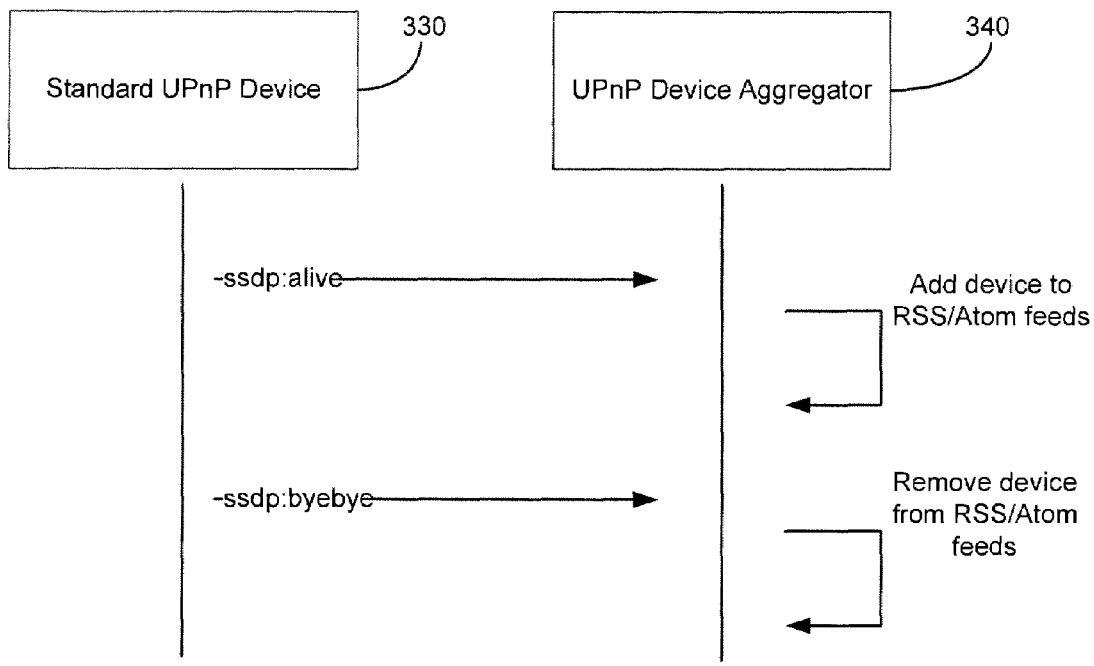
FIG. 4 shows the process by which the UPnP device aggregator monitors SSDP traffic from a standard UPnP device and aggregates the monitored information as a really simply sindication (RSS)/ATOM feed.
Figure 5:
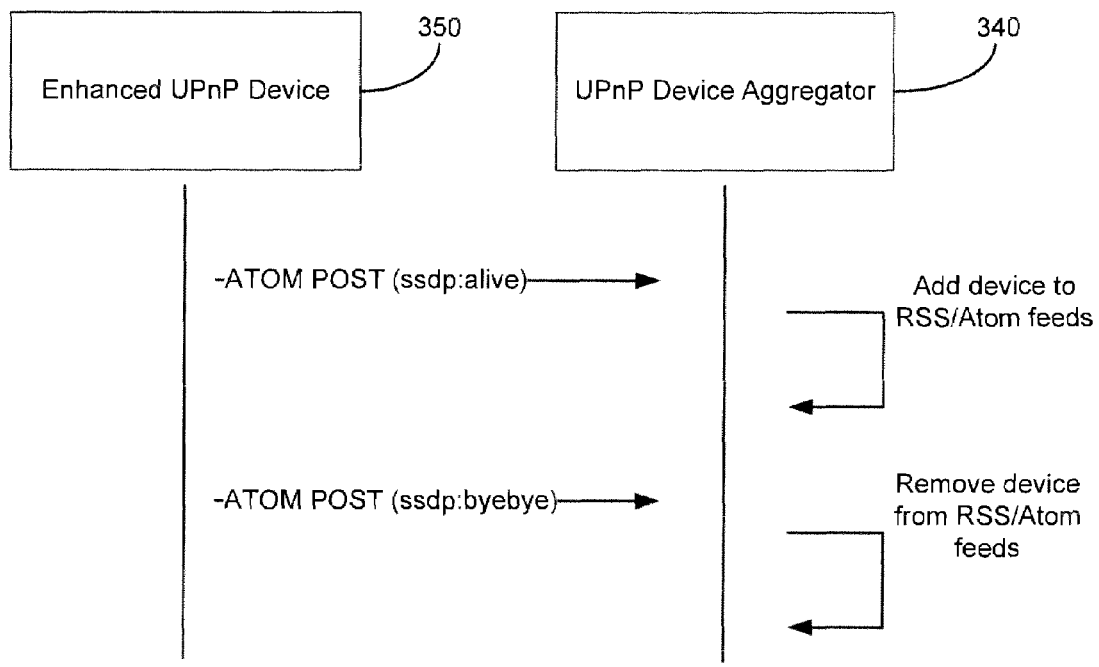
FIG. 5 shows a process by which the device aggregator collects information about remote devices by accepting ATOM POST messages from the devices.

FIG. 3 is a representation of the protocol stack among a standard UPnP device 330, a UPnP device aggregator 340, and an enhanced UPnP device 350. The primary function of the UPnP device aggregator 340 is to collect information about the UPnP devices that are present in the network by monitoring the UPnP SSDP traffic and to aggregate this information into a RSS/ATOM feed. FIG. 4 shows this device aggregation, as the UPnP device aggregator 340 monitors ssdp:alive and ssdp:byebye messages from the standard UPnP device 330, and adds the relevant information to or removes the information from the RSS/ATOM feeds, respectively. The UPnP device aggregator 340 also collects information about remote devices such as enhanced UPnP devices 350 by accepting ATOM POST messages from the devices. This process is depicted in FIG. 5. As shown in FIG. 5, when an ATOM POST (ssdp:alive) message is transmitted from the enhanced UPnP device 350, the UPnP device aggregator 340 adds the device to the RSS/ATOM feed within the network. The device is removed when the UPnP device aggregator 340 receives an ATOM POST (ssdp:byebye) message from the enhanced UPnP device 350.

Figure 6:
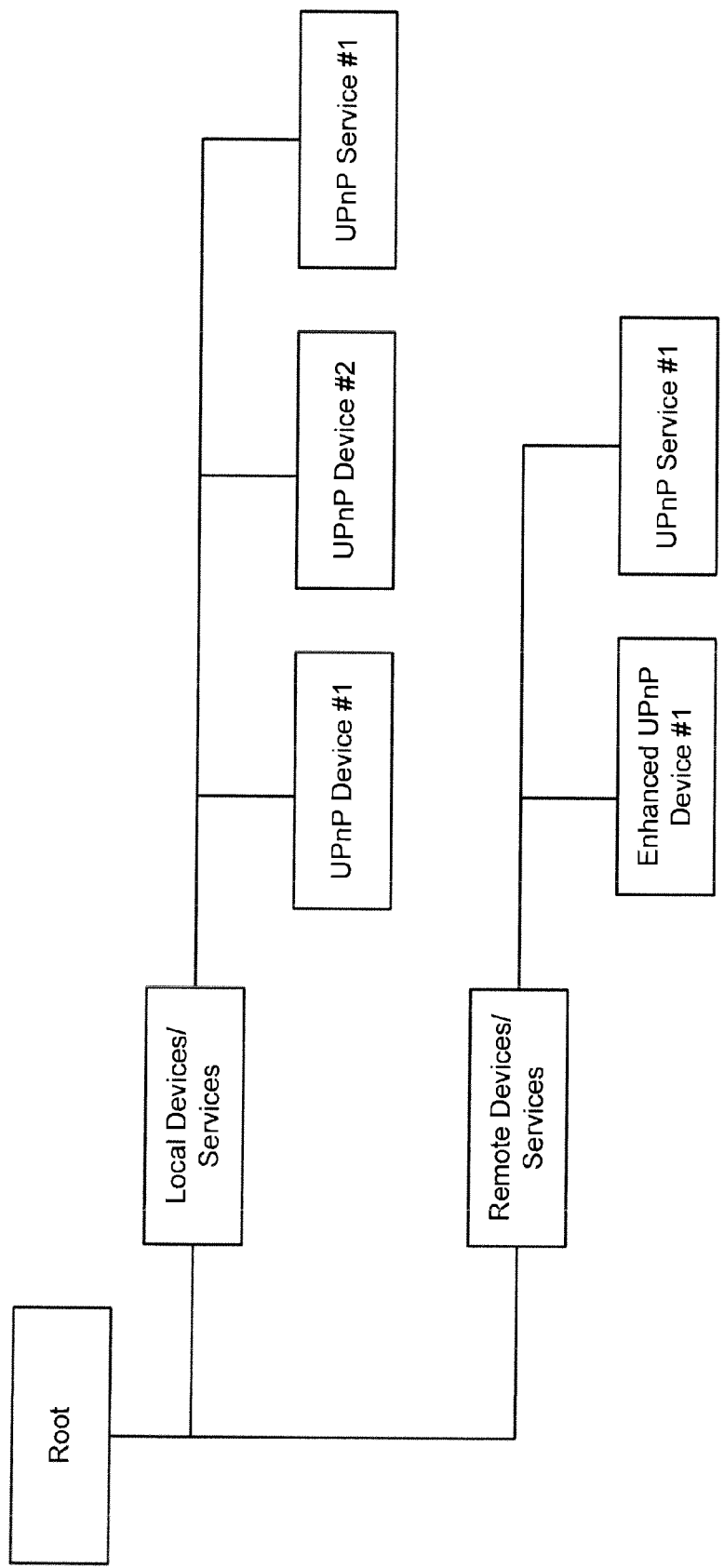
FIG. 6 is a representation of a feed structure for device aggregation.

The RSS/ATOM feed created by the UPnP device aggregator 340 keeps track of how the particular device information was acquired. Devices that were discovered through SSDP announcements are kept in a local branch, while devices that were discovered from ATOM feeds are kept in a remote branch. The feed structure for such device aggregation is depicted in FIG. 6.

Figure 7:
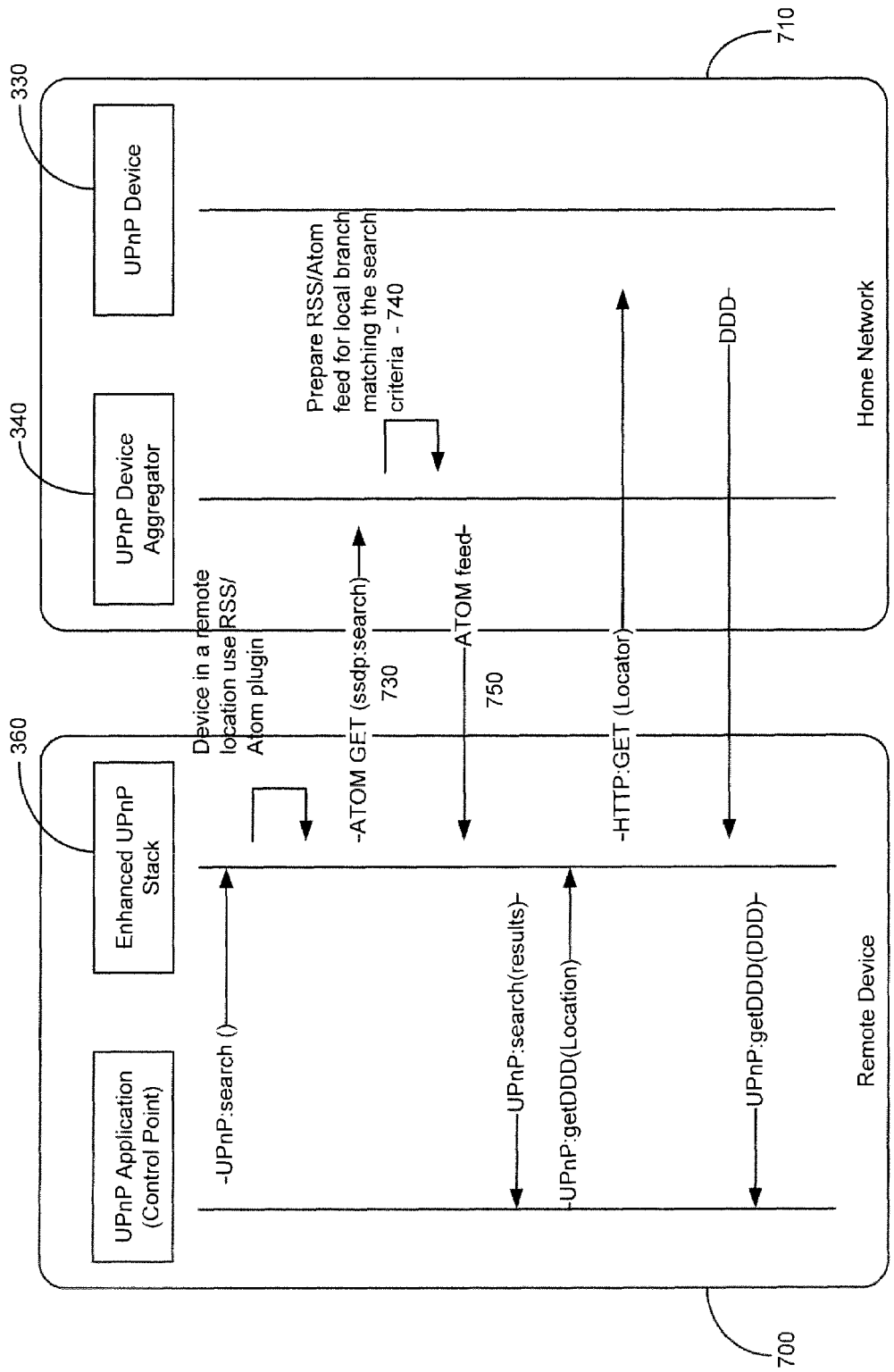
FIG. 7 is a representation of a remote search process.

FIG. 7 is a representation of remote search process for a remote device 700 and a home network 710. As shown in FIG. 7, the enhanced UPnP device architecture stack 360 from the remote device (i.e., the enhanced UPnP device 350) detects that it is in a remote location using bearer characteristics hints (e.g., GPRS/WCDMA, WLAN hotspot) or through the existence of secure remote connections to home and starts using the ATOM plugin. The use of the ATOM plugin is represented in FIG. 7. In order to search for a service device, the remote device fetches the ATOM feed from the home UPnP device aggregator 340. This is accomplished by the enhanced UPnP stack 360 transmitting an ATOM GET (ssdp:search) message 730. the UPnP device aggregator 340 then prepares the RSS/ATOM feed for the local branch matching the search criteria at 740, after which the ATOM feed is made available to the enhanced UPnP stack 360 at 750. The enhanced UPnP stack 360 then parses the feed, extracts the location URI and downloads the device description document directly from the UPnP device that is located in the home network. The rest of the UPnP communication can then occur directly between the remote device and the home network device.

Figure 8:
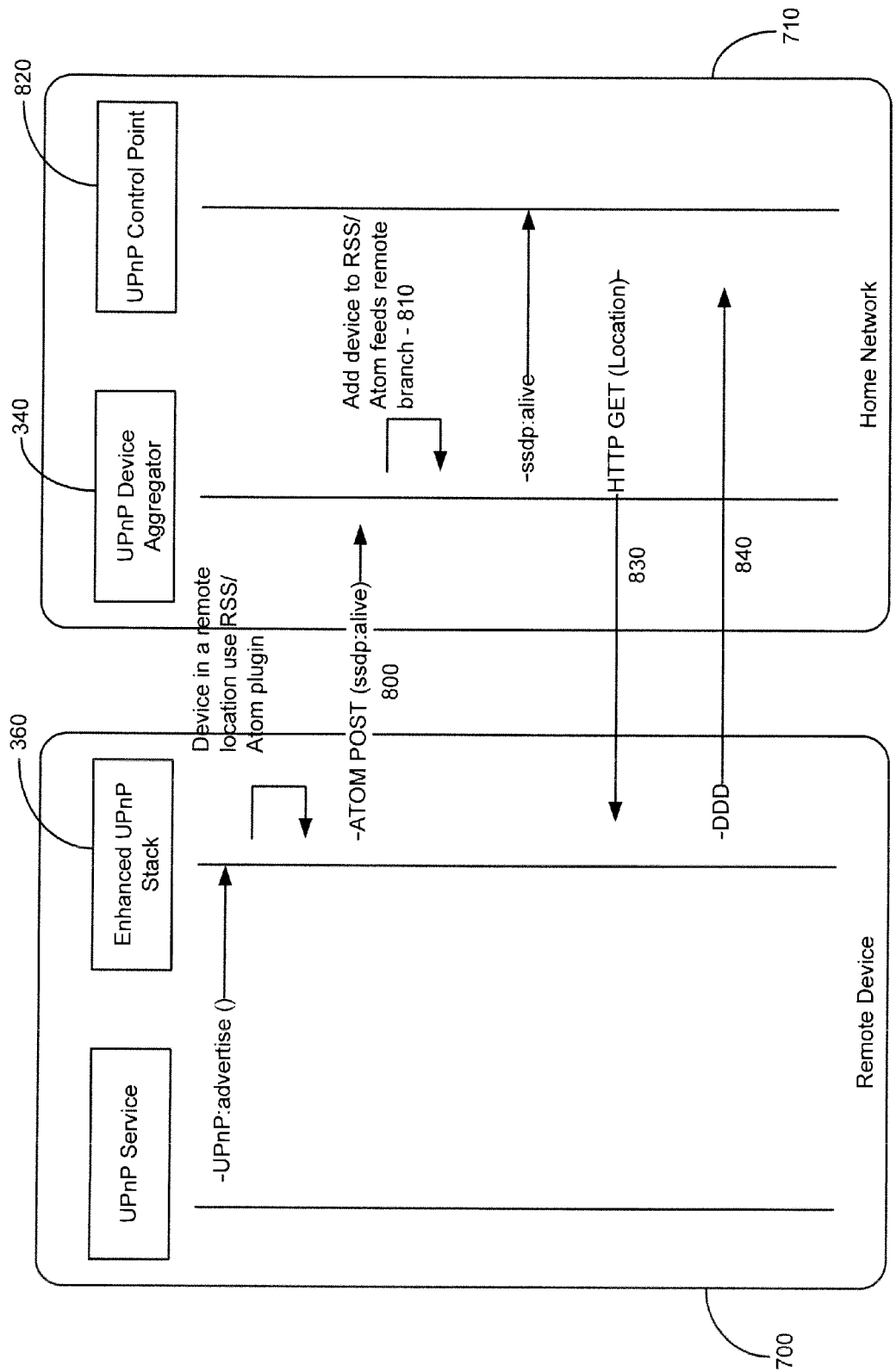
FIG. 8 is a representation of a remote announcement process.

FIG. 8 is a representation of a remote announcement process. When the remote device 700 wants to advertise a service, the enhanced UPnP stack 360 updates the home UPnP device aggregator 340 in the home network 710 with an ATOM POST message containing the ssdp:alive information. This is represented at 800 in FIG. 8. When the UPnP device aggregator 340 receives the update, it sends a UPnP ssdp:alive message within the home network with the information that has been received from the remote device. This is represented at 810 in FIG. 8. Once the UPnP ssdp:alive message has been received by any UPnP control points 820 within the home network 710, they are capable of directly communicating with the remote device 700, as represented at step 830 and 840.

Figure 9:
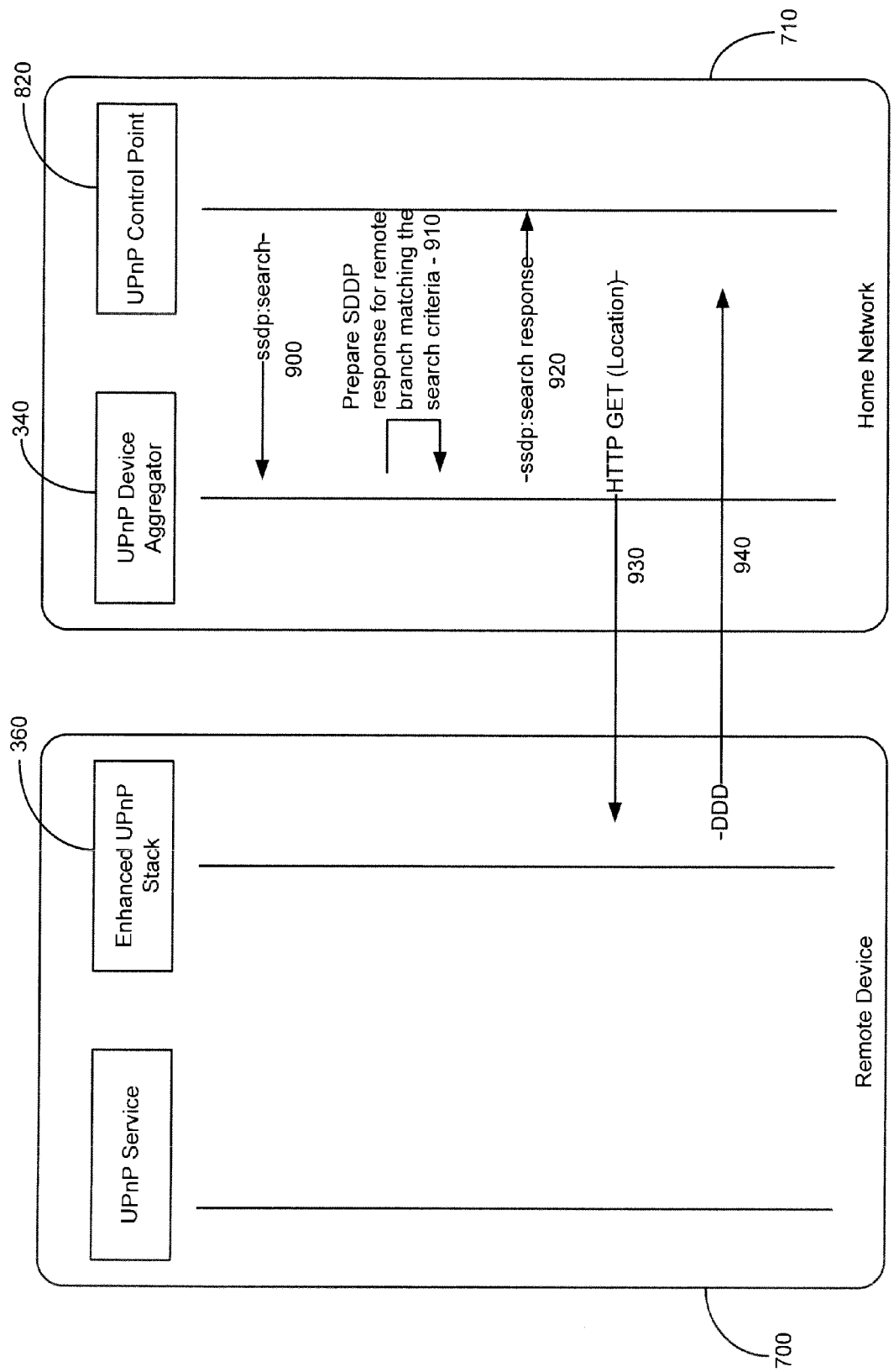
FIG. 9 is a representation of a local search process.

FIG. 9 is a representation of a local search process. In FIG. 9, a local device (the UPnP control point 820) is looking for services of interest by transmitting a ssdp:search multicast message at 900. The UPnP device aggregator 340 receives this message, prepares a SSDP response for the remote branch matching the search criteria 910, and transmits a ssdp:search:response message 920 back to the UPnP control point 820. As a result of this process, the remote device 700 is "UPnP" visible to the UPnP control point 820 within the home network 710. After receiving the ssdp:search:response message from the UPnP device aggregator 340, the UPnP control point 820 can directly fetch the remote device description from the remote device 700, as represented at 930 and 940.

Figure 10:
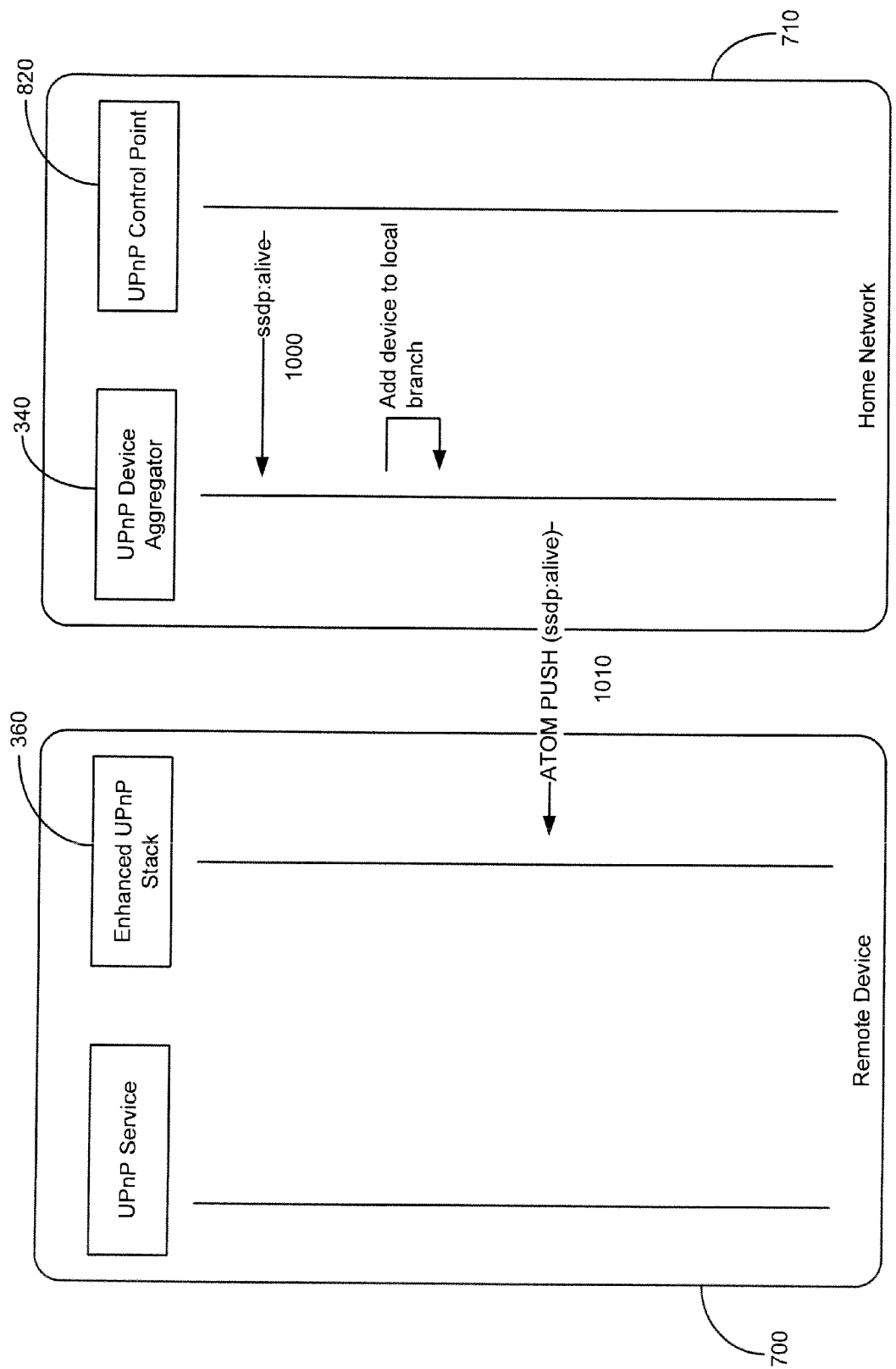
FIG. 10 is a representation of a local announcement process.

FIG. 10 is a representation of a local announcement process. When a new local device joins the home network 710, it transmits a ssdp:alive message 1000 on the home network 710. the UPnP device aggregator 340 listens and, once it receives the ssdp:alive message 1000, pushes the device information to the remote device 700 using an ATOM PUSH (ssdp:alive) message 1010.

Figure 11:
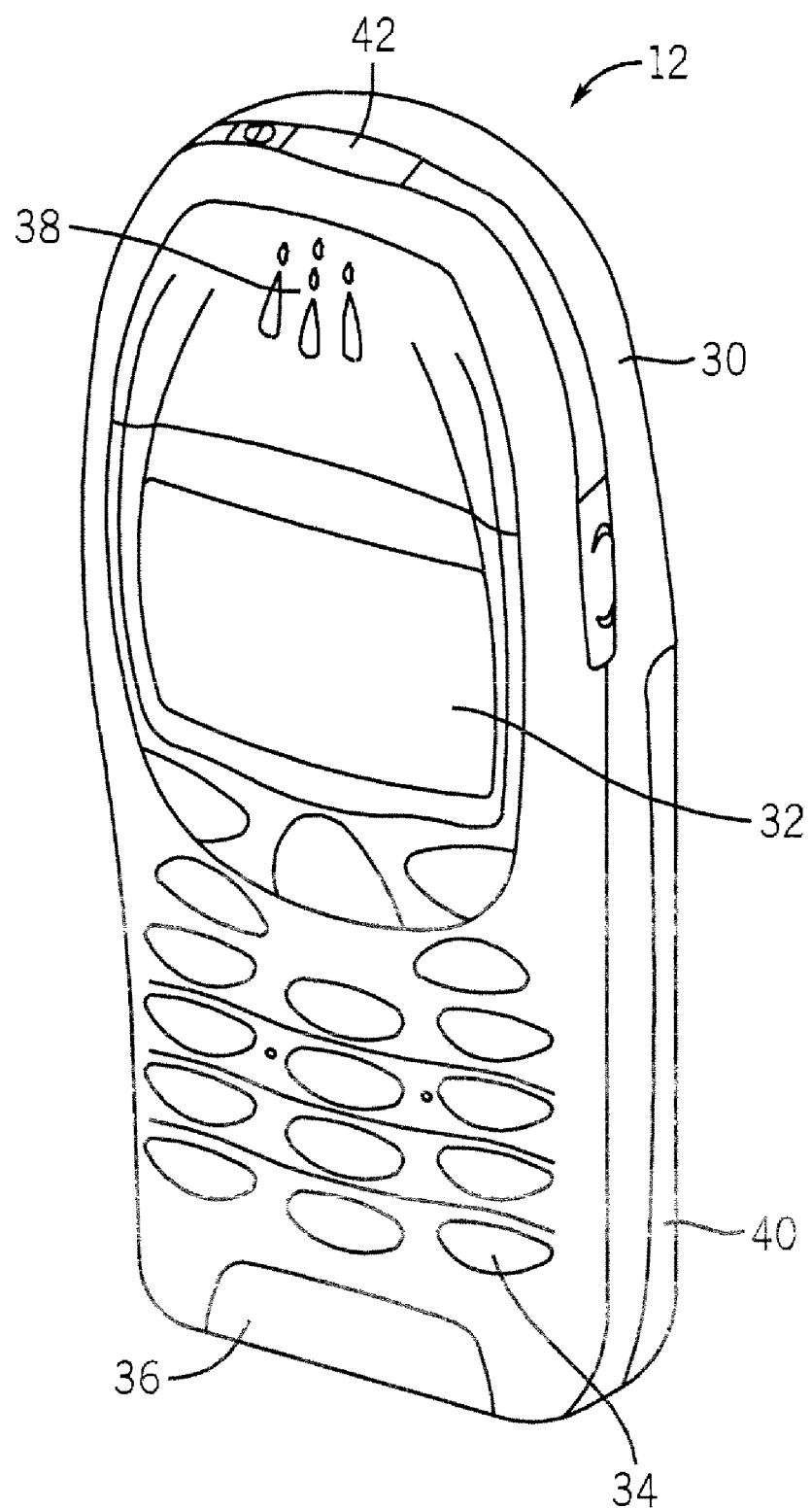
FIG. 11 is a perspective view of a mobile telephone that can be used in the implementation of the present invention.
Figure 12:
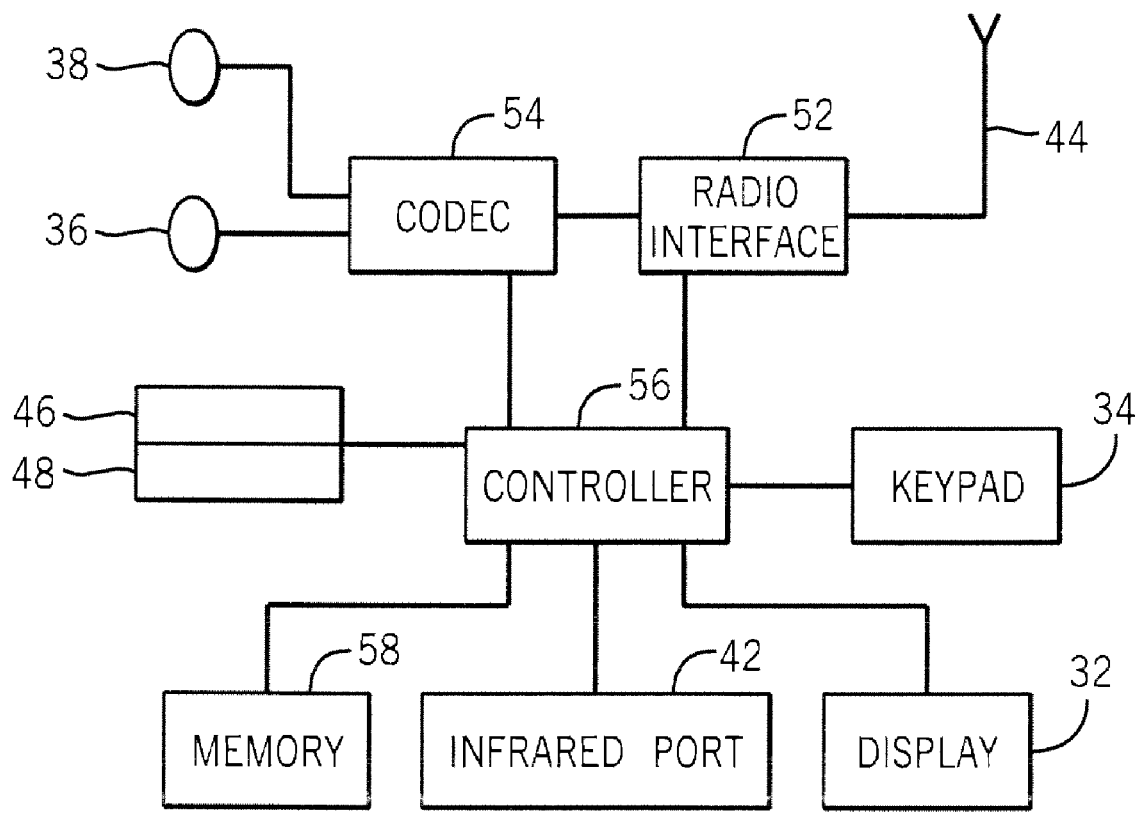
FIG. 12 is a schematic representation of the telephone circuitry of the mobile telephone of FIG. 11.

FIGS. 11 and 12 show one representative mobile telephone 12 within which the present invention may be implemented. It should be understood, however, that the present invention is not intended to be limited to one particular type of mobile telephone 12 or other electronic device. It should also be understood that some or all of the features of the mobile telephone 12 can be incorporated into virtually of the electronic devices depicted in FIGS. 11 and 12. The mobile telephone 12 of FIGS. 11 and 12 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Communication devices incorporating some or all aspects of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of enabling communication between a remote device and a shadow device, comprising:
    aggregating device information from a real device located within a home network, the aggregated device information including a device description document URL reflecting a real device unique user identifier;
    receiving a request from an alternative device to register as the shadow device, the shadow device including a shadow device unique user identifier;
    rewriting the device description document URL to reflect the shadow device unique user identifier instead of the real device unique user identifier; and
    transmitting the device description document URL including the shadow device unique user identifier to the remote device, after which the remote device uses the shadow device unique user identifier to communicate directly with the shadow device.

2. The method of claim 1, wherein the device information is received from the real device via a ssdp:alive message.

3. The method of claim 1, wherein the device description document URL including the shadow device unique user identifier is transmitted to the remote device via a RSS feed.

4. The method of claim 1, wherein the device description document URL including the shadow device unique user identifier is transmitted to the remote device via an ATOM feed.

5. The method of claim 1, wherein the device description document URL including the shadow device unique user identifier is transmitted through an IPsec tunnel.

6. The method of claim 1, wherein the device information is received in response to a transmitted discovery inquiry.

7. A computer program product, embodied in a computer-readable medium, for enabling communication between a remote device and a shadow device, comprising:
    computer code for aggregating device information from a real device located within a home network, the aggregated device information including a device description document URL reflecting a real device unique user identifier;
    computer code for receiving a request from an alternate device to register as the shadow device, the shadow device including a shadow device unique user identifier;
    computer code for rewriting the device description document URL to reflect the shadow device unique user identifier instead of the real device unique user identifier; and
    computer code for transmitting the device description document URL including the shadow device unique user identifier to the remote device, after which the remote device uses the shadow device unique user identifier to communicate directly with the shadow device.

8. The computer program product of claim 7, wherein the device information is received from the real device via a ssdp:alive message.

9. The computer program product of claim 7, wherein the device description document URL including the shadow device unique user identifier is transmitted to the remote device via a RSS feed.

10. The computer program product of claim 7, wherein the device description document URL including the shadow device unique user identifier is transmitted to the remote device via an ATOM feed.

11. The computer program product of claim 7, wherein the device description document URL including the shadow device unique user identifier is transmitted through an IPsec tunnel.

12. The computer program product of claim 7, wherein the device information is received in response to a transmitted discovery inquiry.

13. A SSDP proxy device for use in enabling communication between a home network device and at least one remote device, comprising:
 a processor; and
 a memory unit communicatively connected to the processor and including:
  computer code for aggregating device information from a real device located within a home network, the aggregated device information including a device description document URL reflecting a real device unique user identifier;
  computer code for receiving a request from an alternate device to register as a shadow device, the shadow device including a shadow device unique user identifier;
  computer code for rewriting the device description document URL to reflect the shadow device unique user identifier instead of the real device unique user identifier; and
  computer code for transmitting the device description document URL including the shadow device unique user identifier to the remote device, after which the remote device uses the shadow device unique user identifier to communicate directly with the shadow device.

14. The SSDP proxy device of claim 13, wherein the device information is received from the real device via a ssdp:alive message.

15. The SSDP proxy device of claim 13, wherein the device description document URL including the shadow device unique user identifier is transmitted to the remote device via an ATOM feed.

16. The SSDP proxy device of claim 13, wherein the device description document URL including the shadow device unique user identifier is transmitted through an IPsec tunnel.

17. The SSDP proxy device of claim 13, wherein the device information is received in response to a transmitted discovery inquiry.

18. A system for enabling communication between a home network device and a remote device, comprising
 a SSDP proxy device configured to aggregate device information from a real device located within a home network, the aggregated device information including a device description document URL reflecting a real device unique user identifier; and
 a shadow device configured to transmit a request to register with the SSDP proxy as the shadow device,
 wherein the SSDP proxy is further configured to:
 rewrite the device description document URL to reflect the shadow device unique user identifier instead of the real device unique user identifier, and transmit the device description document URL including the shadow device unique user identifier to the remote device, after which the remote device uses the shadow device unique user identifier to communicate directly with the shadow device.

19. The system of claim 18, wherein the device information is received from the real device via a ssdp:alive message.

20. The system of claim 18, wherein the device description document URL including the shadow device unique user identifier is transmitted to the remote device via an ATOM feed.

21. The system of claim 18, wherein the device description document URL including the shadow device unique user identifier is transmitted through an IPsec tunnel.

22. The system of claim 18, wherein the device information is received in response to a transmitted discovery inquiry.

23. A network element, comprising:
 a processor; and
 a memory unit communicatively connected to the processor and including:
  computer code for aggregating device information from a real device located within a network, the aggregated device information including a real device unique identifier;
  computer code for receiving a request from an alternate device to register as a shadow device, the shadow device including a shadow device unique identifier;
  computer code for updating the aggregated device information to reflect the shadow device unique identifier instead of the real device unique identifier; and
  computer code for transmitting the shadow device unique identifier to the remote device, after which the remote device uses the shadow device unique identifier to communicate directly with the shadow device.

24. The network element of claim 23, wherein the shadow device unique identifier is transmitted to the remote device via an ATOM feed.

25. The network element of claim 23, wherein the the shadow device unique identifier is transmitted through an IPsec tunnel.

26. The network element of claim 23, wherein the device information is received in response to a transmitted discovery inquiry.

* * * * *